United States Patent [19]

Ast

[11] Patent Number: 4,494,626

[45] Date of Patent: Jan. 22, 1985

[54] COMBINATION STEPLADDER AND HAND TRUCK APPARATUS

[75] Inventor: Dale A. Ast, Wichita, Kans.

[73] Assignee: Harper, Truck, Inc., Wichita, Kans.

[21] Appl. No.: 440,847

[22] Filed: Nov. 12, 1982

[51] Int. Cl.³ .................... E06C 1/397; B62B 1/20
[52] U.S. Cl. ............................ 182/20; 182/106; 182/16; 280/30
[58] Field of Search .................... 182/20, 21, 16, 106, 182/165, 174, 175, 22; 280/30

[56] References Cited

U.S. PATENT DOCUMENTS

| 300,496 | 6/1884 | Nelson | 280/30 |
|---|---|---|---|
| 345,973 | 7/1886 | Hill | 280/30 |
| 548,111 | 10/1895 | Cardarelli | 182/22 |
| 867,754 | 10/1907 | Randall | 280/30 |
| 1,992,108 | 2/1935 | White | 182/16 |
| 2,980,200 | 4/1961 | Kibby | 182/16 |
| 3,104,889 | 9/1963 | Branch | 182/20 |
| 3,897,080 | 7/1975 | Isom | 182/16 |
| 3,954,155 | 5/1976 | Guidara | 182/20 |
| 4,258,826 | 3/1981 | Murray | 182/20 |

FOREIGN PATENT DOCUMENTS

| 280130 | 4/1952 | Switzerland | 182/106 |
|---|---|---|---|
| 1288251 | 9/1972 | United Kingdom | 182/20 |

Primary Examiner—Reinaldo P. Machado
Attorney, Agent, or Firm—Phillip A. Rein

[57] ABSTRACT

This invention is a combination stepladder and hand truck apparatus having a ladder support frame assembly pivotally connected to an upper portion of a hand truck support frame assembly and further including a support and lock plate assembly and a wheel support assembly which are both connected to a lower portion of the hand truck support frame assembly. The ladder support frame assembly includes a basic support frame with a support handle member at one end portion thereof and interconnected by axially spaced support step assembly. The support step assembly includes a lock or latch step member which is operable to support a user thereon and conjointly locks with the hand truck support frame assembly in a rigid condition when in the stepladder usage condition. The support and lock plate assembly includes a support plate member which is pivotally mounted on a support shaft member which, in turn, is secured across a lower portion of the hand truck support frame assembly. The support plate member is pivotally movable to a nonusage condition when utilizing the invention in a stepladder usage condition. The support plate member is pivotal into a latched or locked condition to hold the ladder support frame assembly against the hand truck support frame assembly when placed in the hand truck usage condition. The wheel support assembly is placed in an elevated position not contacting the adjacent support surface when the invention is moved to the stepladder usage condition. The wheel support assembly is adapted to contact the support surface when the adjacent ladder support frame assembly and hand truck support frame assembly are moved rearwardly to a desired position of 22½ degrees from a vertical plane to the support surface to operate as a conventional hand truck structure.

8 Claims, 7 Drawing Figures

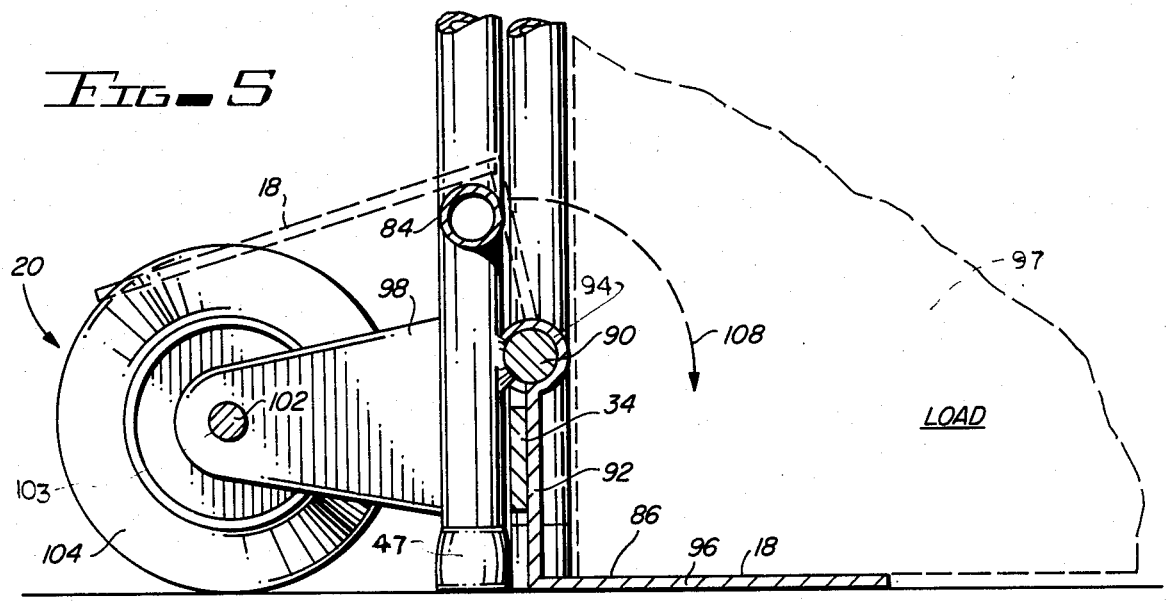
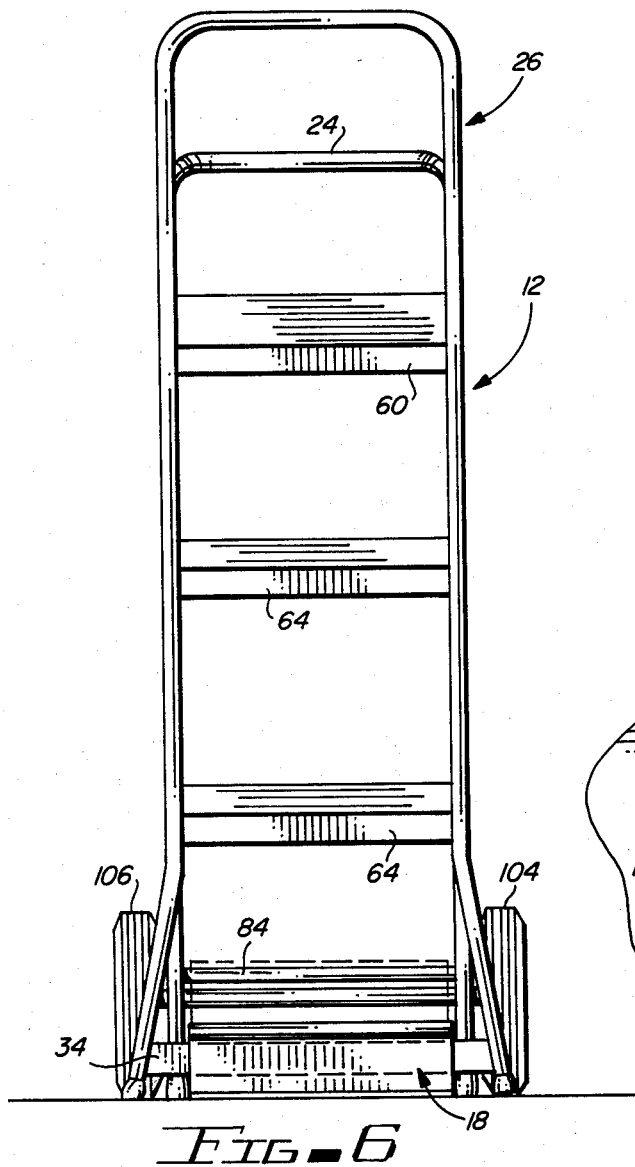
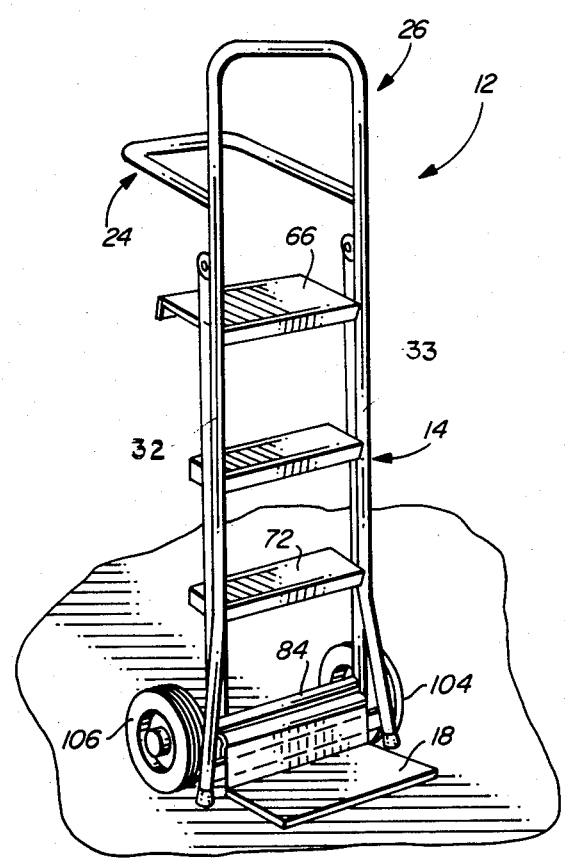

COMBINATION STEPLADDER AND HAND TRUCK APPARATUS

PRIOR ART

The following United States Patents were noted in a patentability search conducted on the invention herein:

| | | |
|---|---|---|
| 4,258,826 | 2,980,200 | 345,973 |
| 3,954,155 | 867,754 | |
| 3,104,889 | 548,111 | |

It is noted that combination stepladder and hand truck structures are set forth in the patent references cited above in the broad context.

The Branch, Jr. patent discloses a hand truck structure which has some similarity to our invention herein in that being foldable into a hand truck structure and expandable to be used as a stepladder. However, our invention set forth herein has substantial important differences relative thereto.

The other references use conventional folding brackets to hold the stepladder in an open usage position or do not have sufficient support in order to conform to present governmental safety regulations.

None of the references teach the unique features of our invention being (1) a locking feature holding our structure together as a unit when in the hand truck or dolly condition; (2) a locking feature to safely hold the stepladder when in the open condition; and (3) a utilization of a new and novel handle structure which is placed in a proper position when utilized either as a stepladder or a hand truck structure.

PREFERRED EMBODIMENT OF THE INVENTION

In one preferred embodiment of the invention, a combination stepladder and hand truck apparatus is provided including (1) a ladder support frame assembly; (2) a hand truck support frame assembly pivotally connected to the ladder support frame assembly; (3) a support and lock plate assembly pivotally connected to a lower portion of the hand truck support frame assembly; and (4) a wheel support assembly secured to a lower end of the hand truck support frame assembly and operable to automatically engage and disengage from an adjacent support surface when selectively used as a stepladder or a hand truck structure. The ladder support frame assembly includes a basic support frame having a support handle member secured at an upper end portion thereof and a support step assembly secured to the basic support frame. The basic support frame is provided with a head section integral with parallel leg sections which are interconnected at a lower end thereof by a bottom connector bar. The support handle member includes a central portion integral with support arm portions which, in turn, are secured to the spaced parallel leg sections. The support step assembly includes an upper latch step member and a plurality of spaced adjacent step members. The latch step assembly is operable to engage a portion of the hand truck support frame assembly when in the stepladder usage condition to provide rigidity thereto. The step members are secured as by welding in axially spaced positions along the parallel leg sections and operable when in the open stepladder usage condition to be extended in respective parallel, horizontal planes. The hand truck support frame assembly includes parallel support legs pivotally connected by a connector assembly to respective parallel leg sections of the ladder support frame assembly and having an upper transverse support member and a lower transverse support member, each secured to the opposite ends of the parallel support legs. The support and lock plate assembly includes a support plate member of L-shaped pivotally mounted on a support shaft which, in turn, is secured to lower opposed ends of the parallel support legs. The support plate member is pivoted into a load carrying position when the invention is in the hand truck usage condition and concurrently operates to lock the ladder support frame assembly against the hand truck support frame assembly to prevent lateral movements thereof. The wheel support assembly includes (1) shaft support members secured to respective ones of the spaced parallel support legs; (2) an elongated wheel support shaft extended and supported through openings in the shaft support members; and (3) wheel members rotatively mounted on respective opposite ends of the wheel support shaft. The wheel support assembly is operable in the stepladder usage condition to be elevated from a support ground surface and operable in the hand truck usage condition to be supported on the ground surface for normal usage as a hand truck structure.

OBJECTS OF THE INVENTION

One object of this invention is to provide a combination stepladder and hand truck apparatus which is readily convertible from a compact hand truck structure into a rigid stepladder structure.

One further object of this invention is to provide a combination stepladder and hand truck apparatus which may be readily converted into a stepladder usage condition whereby the support wheels are elevated above the adjacent supporting surface so that the stepladder will not move or slip.

One further object of this invention is to provide a combination stepladder and hand truck apparatus which has a pivotally mounted support plate member which normally carries loads when in the hand truck usage condition but can be pivoted upwardly and rearwardly to achieve a very compact structure for ease of storage.

Another object of this invention is to provide a combination stepladder and hand truck apparatus having a new and novel support handle member which provides (1) a horizontal surface when placed in the stepladder usage condition for supporting paint cans and the like; and (2) a rearward, downwardly inclined position when the structure is in the hand truck usage condition for ease for carrying and transporting loads as in a conventional hand truck structure.

One further object of this invention is to provide a combination stepladder and hand truck apparatus having a pivotally connected support and lock plate assembly which is utilized in the hand truck usage condition (1) to carry loads; and (2) concurrently lock the apparatus together to prevent unintentional opening thereof.

One other object of this invention is to provide a combination stepladder and hand truck assembly which can be easily and readily converted from the hand truck usage condition to the stepladder usage condition; is economical to manufacture; is sturdy in construction; and being substantially maintanance free.

Various other objects, advantages, and features of the invention will become apparent to those skilled in the art from the following description, taken in conjunction with the accompanying drawings, in which:

FIG. 5 is an enlarged sectional view of the structure as shown in a circle 5 as indicated in FIG. 3;

FIG. 6 is a front elevational view of the combination stepladder and hand truck structure of this invention as shown in the hand truck usage condition; and FIG. 7 is a perspective view of the combination stepladder and hand truck apparatus as shown in the folded hand truck usage condition.

Figure 1:
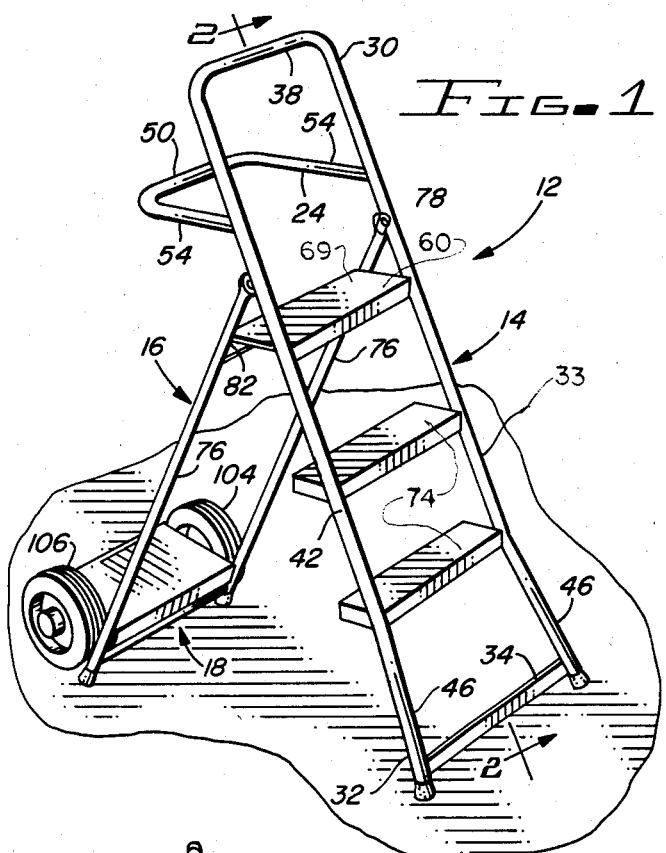
FIG. 1 is a perspective view of the combination stepladder and hand truck apparatus of this invention as illustrated in the stepladder usage condition.

The following is a discussion and description of preferred specific embodiments of the combination stepladder and hand truck apparatus of this invention, such being made with reference to the drawing, whereupon the reference numerals are used to indicate the same or similar parts and/or structure. It is to be understood that such discussion and description is not to unduly limit the scope of the invention.

DESCRIPTION OF THE INVENTION

Referring to the drawing in detail and in particular to FIG. 1, a combination stepladder and hand truck apparatus, indicated generally at 12, includes (1) a ladder support frame assembly 14; (2) a hand truck support frame assembly 16 which is pivotally connected at one end to the ladder support frame assembly 14, (3) a support and lock plate assembly 18 which is pivotally connected to a lower end of the hand truck support frame assembly 16; and (4) a wheel support assembly 20 which is also connected to a lower portion of the hand truck support frame assembly 16.

The ladder support assembly 14 includes a basic support frame 22; a support handle 24 which is connected to an upper portion of the basic support frame 22; and a support step assembly 26 which is secured and axially spaced along a portion of the basic support frame 22.

As best shown in FIGS. 1 and 7, the basic support frame 22 includes an upper head section 30 having opposite sides integral with parallel leg sections 32 and 33 and lower ends thereof interconnected by a bottom connector bar 34. The head section 30 is provided with a curved top section 38 which serves as a stabilizer bar when used in the stepladder usage condition as will be explained.

The parallel leg sections 32 and 33 each includes an elongated main body 42 and having an outwardly divergent integral leg portion 46 at lower ends thereof. A lower end portion of each divergent leg portion 46 may be provided with a rubber cap member 47 thereon for stability when used in the stepladder usage condition.

The bottom connector bar 34 is shown as being of a rectangular shape in transverse cross section in FIG. 5 so as to achieve a compact, closed condition when placed in the hand truck usage condition as will be explained.

The support handle member 24 includes a central portion 50 integral on opposite sides thereof with parallel support arm portions 54. The support arm portions 55 have inner ends secured as by welding or the like to an upper portion 55 of the parallel leg sections 32 and 33. The angular relationship of the support handle member 24 to the basic support frame 22 is such that the support handle member 24 is a horizontal plane when in the stepladder usage condition as shown in FIG. 1.

The support step assembly 26 includes an upper lock or latch step member 60 and a plurality of step members 65 positioned therebelow, all secured to and between the leg sections 32, 33. It is obvious that one, two, three or more step members 64 may be provided in this invention depending on the height desired when in the stepladder usage condition limited by practical considerations of usage as a hand truck.

The latch step member 60 includes a step body section 66 having outer ends secured as by welding to adjacent portions of the parallel leg sections 32, 33 and having an outward, downwardly extended lock lip section 68. The step body section 66 provides an upper support surface 69 when utilized in a stepladder usage condition which is parallel to a support surface 70. The lock lip section 68 provides a connection to a portion of the hand truck support frame assembly 16 in a manner to be explained.

The step members 64 are each provided with a support body 72 of generally rectangular box shape which are secured as by welding in axially spaced positions along the parallel leg section 32, 33 of the basic support frame 22. The step members 64 include upper support surfaces 74 in planes parallel to each other and to the support surface 69 of the latch step member 60.

Figure 2:
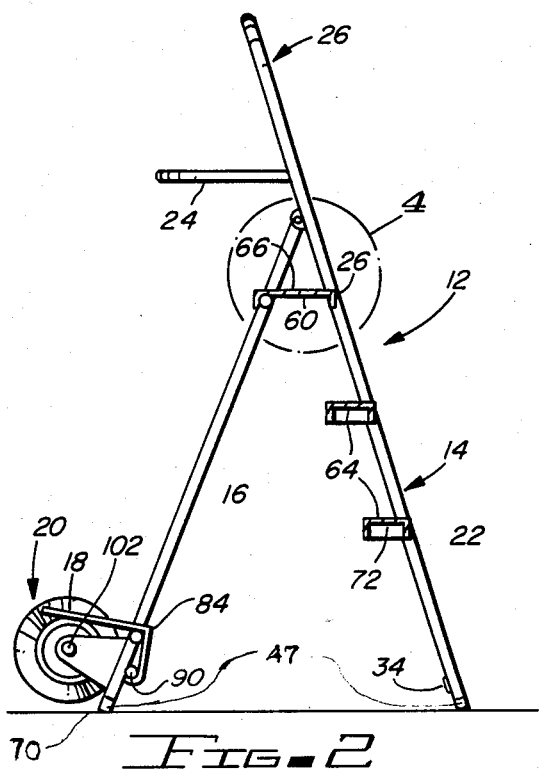
FIG. 2 is a sectional view taken along line 2—2 in FIG. 1.

As shown in FIGS. 1 and 2, the hand truck support frame assembly 16 includes a pair of parallel support legs 76 which are pivotally connected by connector assemblies 78 to respective upper portions of the parallel leg sections 32, 33 and having an upper transverse support member 82 and a lower transverse support member 84.

The parallel support legs 76 may be constructed of circular, square, or rectangular tubing as desired being of sufficient strength to operate in the stepladder and hand truck usage positions. Each connector assembly 76 may consist of a nut and bolt member or support shaft as desired. The upper transverse support member 82 provides rigidity to the spaced support legs 76 plus cooperates with the latch step member 60 in a manner to be explained.

The lower transverse support member 84 provides additional rigidity between the space parallel support leg 76 and supports a portion of the support and lock plate assembly 18 thereon when in the stepladder usage condition as shown in FIGS. 1 and 2.

It is obvious that the lower ends of the respective parallel support legs 76 may be provided with rubber cap members 47 similar to that of parallel leg sections 32, 33 of the ladder support assembly 14 so that the apparatus will not slide on the support surface 70 when in the stepladder usage condition as shown in FIGS. 1 and 2.

As best shown in FIG. 5, the support and lock assembly 18 includes a main support plate member 60 of generally L-shaped in transverse cross section which is pivotally mounted on a support shaft member 90 which, in turn, has its opposite ends secured as the welding to lower end portions of the parallel support legs 76.

The support plate member 60 is provided with a load section 96 integral with a connector section 92 which, in turn, is provided with a circular support section 94 which surrounds the support shaft member 90 as shown in FIG. 5. The support plate member 60 functions as a load carrying device with a load 97 normally supported on the load section 96 when in the hand truck usage condition.

It is seen that the load section 96 extends substantially outwardly of the ladder support frame 14 when in the compact folded condition as shown in FIG. 5 wherein it resembles a conventional hand truck structure.

The wheel support assembly 20 includes spaced shaft support members 98 secured to respective ones of the parallel support legs 76; a wheel support shaft 102 having opposite ends extended through a hole 103 in the respective shaft support members 98; and wheel members 104 and 106 are rotatively connected to opposite end portions of the wheel support shaft 102. It is noted that the wheel support assembly 20 acts substantially as a normal support wheel construction on a hand truck structure and supports a load carried thereon when in the tilted transport usage condition.

Figure 3:
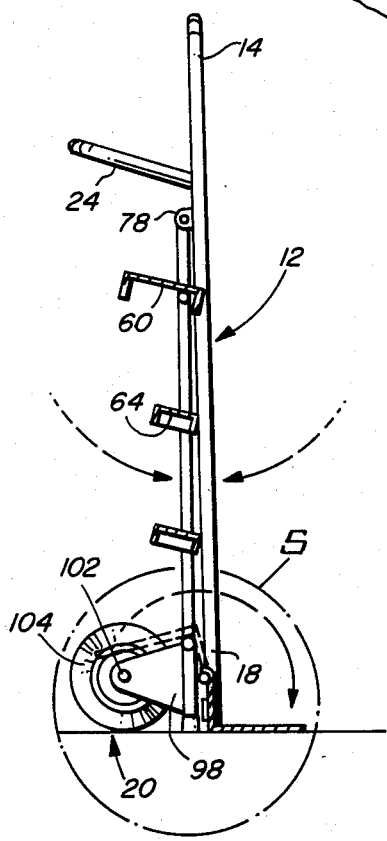
FIG. 3 is a sectional view similar to FIG. 2 except showing the combination stepladder and hand truck apparatus in the hand truck usage condition.
Figure 4:
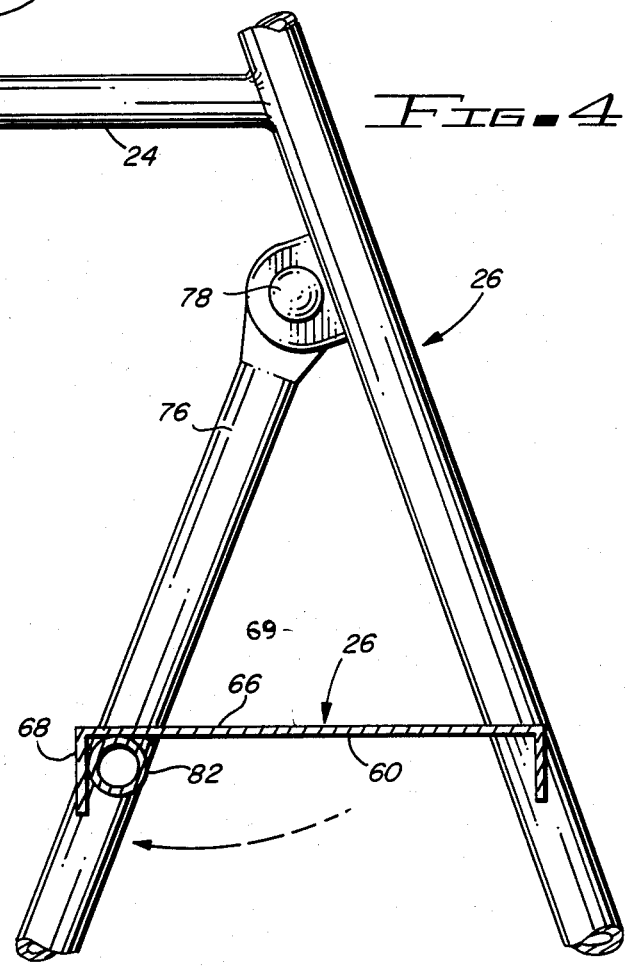
FIG. 4 is an enlarged sectional view of the structure as shown in a circle 4 as indicated in FIG. 2.

In the preferred embodiment of this invention, it is seen that when in the hand truck usage condition as shown in FIG. 3, the lower surface of the support plate member 60 rests on the ground surface 70 as does the lowermost outer surface of the support wheel members 104 and 106. In this condition, it is noted that the basic support frame 22 and the parallel support legs 76 are extended in a vertical and parallel planes to each other. At this time, it is noted that the upper surfaces of the latch step member 60 and step members 64 plus the support handle member 24 are extended in parallel planes which are at an angle of preferably 22½ degrees relative to a horizontal plane.

On movement to the stepladder usage condition as shown in FIGS. 1 and 2, it is seen that the upper surfaces of the latch step member 60, step members 64, and the support handle member 24 are in spaced, parallel, horizonal planes.

USE AND OPERATION OF THE INVENTION

In the use and operation of the combination stepladder and hand truck apparatus 12 of this invention it is seen that the ladder support frame assembly 14 and the hand truck support frame assembly 16 can be pivotally moved to an upright position with the parallel legs section 32, 33 adjacent to and parallel to the support legs 76 as noted in FIG. 3. In this vertical condition, it is noted that the support plate member 60 can be pivoted about the support shaft member 90 to a position as shown in dotted lines in FIG. 3. In this position, the support member 60 rests upon the lower transverse support member 84 and extends rearwardly of the upright parallel leg section 32 and 33. This achieves a minimum width thereof between the rearward surfaces of the wheel member 104 and 106 and the central portion 50 of the support handle member 21 and the front surface of the basic support frame 22 which can then be stored in a minimum amount of space.

In order to use as a hand truck structure, it is obvious that the support plate member 60 can be rotated about the support shaft member 90 to the position as shown in solid lines in FIG. 5 as indicated by the arrow 108. It is obvious that a load such as boxes may be placed on the load section 96 of the support plate member 60. Next, the support handle member 24 may be grasped and the entire apparatus tilted rearwardly on the wheel members 104 and 106 into a load carrying condition. It is found that a rearward tilted movement of preferably 22½ degrees relative to a vertical plane will place the support arm portions 54 of the support handle member 24 in a parallel horizontal plane relative to the support 70 which is the best position for movement of a load and, the central portion 50 is also available for grasping and holding by one utilizing the same in the hand truck usage condition.

On reaching a certain destination and unloading the boxes or load carried on the combination stepladder and hand truck apparatus 12, it is obvious that the same may be utilized as a stepladder if so desired. To do so, the support plate member 60 may be pivoted with one foot or other means in a counter clockwise direction as illustrated in dotted lines in FIG. 3. This then releases the locking feature of the lower transverse support member 84 between the basic support frame 22 and the parallel support legs 76 of the hand truck support frame assembly 16.

Next, the support handle member 24 is moved downwardly from the position of FIG. 3 which will automatically move the parallel leg sections 32 and 33 outwardly so as to achieve the stepladder usage condition as shown in FIGS. 1 and 2. Concurrently, the upper transverse support member 82 automatically moves within and contacts the junction of the step body section 66 and lock lip section 68 of the latch step member 60. This automatically moves the parallel leg sections 32 and 33 and the support legs 76 into a condition of being separated by an angle of 45 degrees as clearly shown in FIG. 2.

It is also noted that the top surfaces of the support handle member 24, the latch step member 60, and the step members 64 are in parallel, horizontal planes relative to each other and the support surface 70. A board or the like can be placed on the upper surface of the support handle member 24 to support paint cans or the like. It is noted in FIG. 2 that this movement to the stepladder usage condition also elevates the support surfaces of the wheel members 104 and 106 above the ground surface 70 for stability. Additionally, the resilient or rubber cap members 47 on the lower respective ends of the parallel leg sections 32, 33 and the support legs 76 prevent skidding movement on the support surface 70 for additional safety purposes.

As noted in FIGS. 1 and 2, the upper portion or head portion 30 of the basic support frame 22 is extended in a vertical plane substantially adjacent to vertical planes extending upwardly through the latch step member 60. This is advantageous when standing on the latch step member 60 as a person utilizes the same in placing a portion of his leg against the head portion 30. This is advantageous as it allows one to achieve stability and orientation relative to the entire combination stepladder and hand truck apparatus 12 when looking upwardly. This is especially important when used outdoors and a person loses his orientation on looking upwardly and standing on the top step. This leg contact with the head portion 30 of the basic support frame 22 is a very important part of this invention and provides a safety feature not found in other stepladder structures.

It is seen that the angular relationships of the latch step member, the step members, and the support handle assembly relative to the lateral support frame assembly and the hand truck support frame assembly presents a new and novel operation of this invention with the resultant safety features. Also, an important feature is the pivotal movement of the support plate member about the support shaft member so as to provide a positive locking feature in locking the ladder support frame assembly against the hand truck support assembly when in the hand truck usage condition for safety stability purposes.

The combination stepladder and hand truck apparatus of this invention is constructed with a minimum amount of moving parts; substantially rigid in construction; generally economical to manufacture; and simple to use. The combination feature of a stepladder and a hand truck is very important as substantially the two functions are jointly necessary such as moving a heavy load to a location, unloading the same, and placing the load on elevated support shelves or the like.

It is obvious that the combination stepladder and hand truck apparatus of this invention may be utilized for 1, 2, 3, or more step members thereon depending on the elevation desired to be achieved when in the stepladder usage condition. However, this must be compatible with operation of the invention when in the hand truck usage condition.

It is obvious that the combination stepladder and hand truck apparatus may be constructed of lightweight aluminum material for ease of conveyance. Also, the use of the support wheel members with a stepladder structure allows the same to readily and easily moved from one place to another by merely rolling along the support surface.

While the invention has been described in conjunction with preferred specific embodiments thereof, it will be understood that this description is intended to illustrate and not to limit the scope of this invention, which is defined by the following claims.

I claim:

1. A combination stepladder and hand truck apparatus, comprising:
   (a) a ladder support frame assembly having a support handle member and a support step assembly connected thereto;
   (b) a hand truck support frame assembly having one end pivotally connected to said ladder support frame assembly and a wheel support assembly connected to another end of said hand truck support frame assembly;
   (c) said ladder support frame assembly and said hand truck support frame assembly of inverted V-shaped when in the stepladder usage condition ; and
   (d) a support and lock plate assembly having a support plate member pivotally mounted between said another end of said hand truck support frame assembly.

2. A combination stepladder and hand truck apparatus as described in claim 1 wherein:
   (a) said support step assembly includes a top latch step member and more than one lower adjacent step members, each secured at a forward portion thereof to said leg sections and extended rearwardly therefrom;
   (b) said latch step member having a lock lip section engagable with said hand truck support frame assembly to limit lateral movement thereof relative to said ladder support frame assembly.

3. A combination stepladder and hand truck apparatus, comprising:

(a) a ladder support frame assembly including a basic support frame having elongated parallel leg sections interconnected by a support step assembly;
   (b) a hand truck support frame assembly having one end pivotally connected to said ladder support frame assembly;
   (c) a wheel support assembly connected to another end of said hand truck support frame assembly having wheel members engagable with a support surface when in a hand truck usage condition;
   (d) said support step assembly latches with said hand truck support frame assembly when moved to a stepladder usage condition to limit lateral movement of outer ends of said ladder support frame assembly and said hand truck support frame assembly;
   (e) a support and lock plate assembly having a support plate member pivotally connected to said another end of said hand truck support frame assembly; and
   (f) said support plate member engages and holds a portion of said ladder support frame assembly against said hand truck support frame assembly when in the hand truck usage condition to prevent separation thereof when carrying a load on said support plate member.

4. A combination stepladder and hand truck apparatus, as described in claim 3, wherein;
   (a) said hand truck support frame assembly includes parallel support legs interconnected by an upper transverse support member and a lower transverse support member; and
   (b) said support plate member contacts and supported on said lower transverse support member when in the raised position in the stepladder usage condition.

5. A combination stepladder and hand truck apparatus as described in claim 3, wherein;
   (a) said leg sections interconnected at a lower end by a connector bar; and
   (b) said support plate member engages said connector bar when in the hand truck usage condition to hold said ladder support frame assembly against said hand truck support frame assembly.

6. A combination stepladder and hand truck apparatus as described in Claim 3 wherein;
   (a) said support plate member pivotally movable between said leg sections for selective use as a hand truck or stepladder structure.

7. A combination stepladder and hand truck apparatus, comprising:
   (a) a ladder support frame assembly having a support handle member and a support step assembly connected thereto;
   (b) a hand truck support frame assembly having one end pivotally connected to said ladder support frame assembly and a wheel support assembly connected to another end of said hand truck support frame assembly;
   (c) said ladder support frame assembly and said hand truck support frame assembly of inverted V-shaped when in the stepladder usage condition and held by said support step assembly in such condition; and
   (d) a support and lock plate assembly having a support plate member pivotally mounted on a support shaft member which, in turn, is secured between said another end of said hand truck support frame assembly.

8. A combination stepladder and hand truck apparatus as described in Claim 17 wherein:
(a) said support plate member engages a portion of said ladder support frame assembly to hold same against said hand truck support frame assembly in the hand truck usage condition;
whereby any load carried on said support plate member increases the clamping action against any lateral movement of said ladder support frame assembly relative to said hand truck support frame assembly.

* * * * *